United States Patent
Van Seventer

(10) Patent No.: US 11,225,133 B2
(45) Date of Patent: Jan. 18, 2022

(54) MOTOR DRIVE UNIT WITH LIQUID COOLING

(71) Applicant: E-TRACTION EUROPE B.V., Apeldoorn (NL)

(72) Inventor: Timothy Van Seventer, Apeldoorn (NL)

(73) Assignee: E-TRACTION EUROPE B.V., Apeldoorn (NL)

( * ) Notice: Subject to any disclaimer, the term of this patent is extended or adjusted under 35 U.S.C. 154(b) by 0 days.

(21) Appl. No.: 16/632,802

(22) PCT Filed: Jul. 20, 2018

(86) PCT No.: PCT/NL2018/050508
§ 371 (c)(1),
(2) Date: Jan. 21, 2020

(87) PCT Pub. No.: WO2019/017792
PCT Pub. Date: Jan. 24, 2019

(65) Prior Publication Data
US 2020/0290451 A1    Sep. 17, 2020

(30) Foreign Application Priority Data
Jul. 20, 2017    (NL) .................................... 2019308

(51) Int. Cl.
*B60K 11/02* (2006.01)
*B60K 7/00* (2006.01)

(52) U.S. Cl.
CPC ............ *B60K 11/02* (2013.01); *B60K 7/0007* (2013.01)

(58) Field of Classification Search
CPC .............................. B60K 11/02; B60K 7/0007
See application file for complete search history.

(56) References Cited

U.S. PATENT DOCUMENTS

| 7,347,427 B2 | 3/2008 | Heinen |
| 7,579,805 B2 * | 8/2009 | Saito ..................... H02M 7/003 |
| | | 318/767 |

(Continued)

FOREIGN PATENT DOCUMENTS

| DE | 102014015827 A1 | 4/2016 |
| EP | 1252034 A1 | 10/2002 |

(Continued)

OTHER PUBLICATIONS

International Search Report and Written Opinion, dated Nov. 27, 2018, from corresponding PCT application No. PCT/NL2018/050508.

*Primary Examiner* — Erez Gurari
(74) *Attorney, Agent, or Firm* — Nixon & Vanderhye

(57) ABSTRACT

A motor drive unit for an in-wheel motor includes a housing and one and capacitors and solid state switching devices arranged within the housing. The housing includes: a lower compartment including a bottom plate, sidewalls which extend from the bottom plate, and end sides at the transverse ends of the sidewalls and bottom plate, wherein the bottom plate is provided with cooling channels for receiving a liquid coolant; a separation plate covering the lower compartment, wherein the separation plate is in thermal contact with the sidewalls and with the capacitors. The solid state switching devices are arranged in the lower compartment between the bottom plate and the separation plate and in thermal contact with the bottom plate, wherein the capacitors are connected to DC bus bars and are arranged at a side of the separation plate that faces away from the lower compartment.

20 Claims, 7 Drawing Sheets

(56) References Cited

U.S. PATENT DOCUMENTS

Figure 1A:
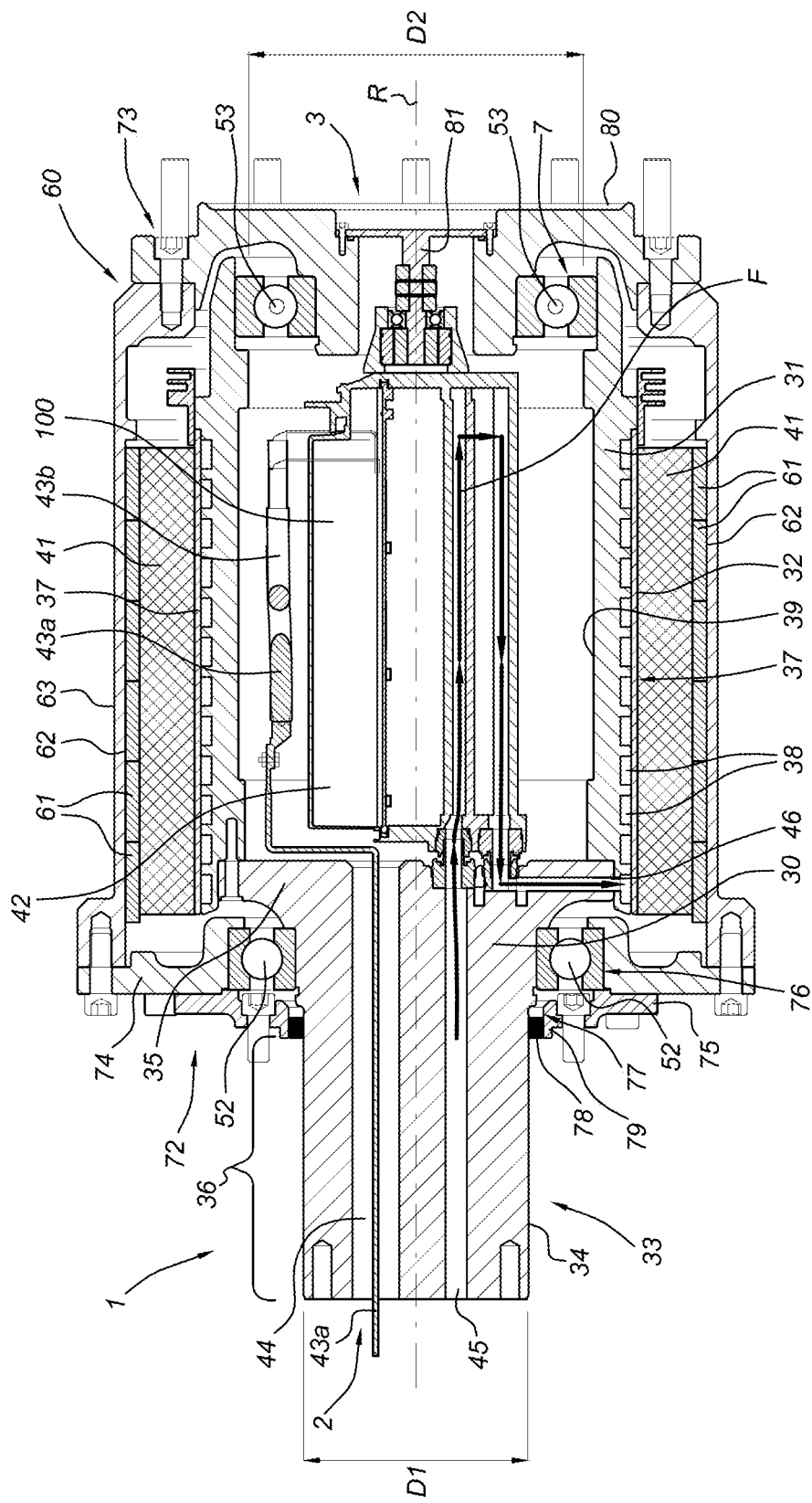

| | | | |
|---|---|---|---|
| 9,362,040 B2* | 6/2016 | Rai | H05K 7/20927 |
| 9,387,758 B2 | 7/2016 | Heinen | |
| 9,561,715 B2* | 2/2017 | Bindl | B60K 17/303 |
| 9,769,962 B2* | 9/2017 | Huang | H05K 7/20872 |
| 2009/0231811 A1* | 9/2009 | Tokuyama | H01L 24/40 |
| | | | 361/699 |
| 2014/0117744 A1* | 5/2014 | Vogler | B60K 7/0007 |
| | | | 301/6.5 |
| 2014/0246893 A1* | 9/2014 | Tesar | B60K 7/0007 |
| | | | 301/6.5 |
| 2017/0118868 A1 | 4/2017 | Sevakivi | |
| 2017/0081040 A1 | 5/2017 | Pal | |
| 2017/0194878 A1* | 7/2017 | Jones | H02M 7/003 |
| 2019/0252949 A1* | 8/2019 | Woody | H05K 7/1432 |
| 2020/0130497 A1* | 4/2020 | Katayama | H02K 7/1846 |
| 2020/0290451 A1* | 9/2020 | Van Seventer | B60K 7/0007 |

FOREIGN PATENT DOCUMENTS

| | | |
|---|---|---|
| EP | 1713169 A1 | 10/2006 |
| EP | 3144623 A2 | 3/2017 |
| EP | 3163612 A1 | 5/2017 |
| WO | 0154939 A3 | 2/2002 |
| WO | 2013025096 A1 | 2/2013 |

\* cited by examiner

MOTOR DRIVE UNIT WITH LIQUID COOLING

FIELD OF THE INVENTION

The present invention relates to a motor drive unit for an in-wheel motor, the motor drive unit comprising electrical components comprising one or more capacitors and solid state switching devices, such as IGBT's, for converting electrical current, which is typically at a relatively high voltage, to a form suitable for use by electromagnets of the in-wheel motor, wherein the electrical components are cooled by means of a liquid coolant.

BACKGROUND ART

From WO 2013/025096 an electric vehicle with an in-wheel electric motor is known, in which the rotor of the electric motor is coupled to a rim of the wheel carrying one or more tyres. The stator is mounted on the frame of the vehicle via a wheel suspension system. The known in-wheel motor is part of a direct drive wheel in which the electromagnets of the motor directly drive the rim and the tyre without any intermediate gears. In this manner, weight and space are saved and the number of components in the drive assembly is minimized.

The torque that is generated by the in-wheel motor depends on the flux-carrying surface between the rotor and the stator and is a quadratic function of the rotor radius. The rotor magnets are placed as far outwardly as possible around the stator, to obtain a largest possible rotor radius and the motor design is optimised to minimize the gap between the rotor and the stator for delivering a maximum power and torque to the tyre. The gap width between rotor and stator is on the other hand designed to be large enough to absorb mechanical impacts on the wheel during driving conditions.

The windings of the stator are powered by control electronics that are situated within the stator, which control electronics convert electrical energy from a power supply system of the vehicle, e.g. a battery pack and/or an electric generator, to an AC current that is suitable for use by the electromotor. Such control electronics typically comprise power control electronics, e.g. IGBT current modules and a current regulator, such as described in EP 1 252 034. By using the control electronics to control the current and/or voltage supplied to the windings of the stator, the magnetic field vector of the flux generated by the stator is controlled and the electromotor is operated at the desired torque and/or speed of rotation. By integrating the control electronics within the stator, the length of bus bars which run from the control electronics to the electromagnets can remain short, which is highly desirable in view of minimizing losses of the high electrical currents and voltages generally required for operating such an electromotor, which may for instance amount to 300 A at 700V or more.

In order to cool the electrical motor and/or the control electronics, the known drive assembly is provided with a cooling system having one or more cooling channels that are situated close to an outer surface of the stator and/or the control electronics, through which liquid coolant can flow into and out of the drive assembly.

The in-wheel drive assembly can be embodied as a substantially self-contained module, without any moving parts of the vehicle attached to and/or extending into the rotor. The interior space defined by the rotor is preferably substantially closed off to prevent ingress of foreign particles, such as dust and/or wear particles released by a brake system of the vehicle and/or by the road, into said interior.

The in-wheel drive assembly may be mounted on the vehicle in a variety of positions by connecting the vehicle side of the drive assembly to the vehicle frame.

In the known in-wheel drive assembly, capacitors and IGBTs which form part of the motor drive and which may be arranged on a PCB, are cooled by a cooling system with channels which extend in a circumferential housing which substantially surrounds these electronic components. The known cooling system has as an advantage that it can also be used for cooling electromagnets of the in-wheel motor that are arranged on the outer surface of the circumferential housing. However, most of its cooling capacity is typically used for cooling the electromagnets, resulting in only a relatively small portion of the cooling capacity being left for cooling the electronic components. Thus can result in a decreased operating lifetime of the electronic components. For instance, for some capacitors the capacitor lifetime halves for every 10° C. rise in operating temperature.

EP 1 713 169 describes a semiconductor device, e.g. an inverter for an electric motor, comprising a housing that is provided with wall through which a refrigerant can run. Capacitors and power devices are mounted directly to walls through which the refrigerant runs. A fixing jig may be provided to fix the capacitors to such a wall. As both the capacitors and the power devices are mounted directly to a wall through which the refrigerant runs, particular care has to be taken when assembling or disassembling the housing to avoid refrigerant spilling.

It is an object of the invention to provide a motor drive unit for an in-wheel motor of a vehicle, with cooling system for the electronic components having a simpler construction. It is a further object to provide an in-wheel motor comprising such a motor drive unit.

SUMMARY OF THE INVENTION

To this end, according to a first aspect, the present invention provides a motor drive unit for an in-wheel motor, comprising a housing and one or more capacitors and solid state switching devices arranged within the housing solid state switching device, the housing comprising: a lower compartment comprising a bottom plate, sidewalls which extend from the bottom plate and end sides at the transverse ends of the sidewalls and bottom plate, wherein the bottom plate is provided with cooling channels for receiving a liquid coolant; wherein the housing further comprises a separation plate covering the lower compartment, wherein the separation plate is in thermal contact with the sidewalls and with the one or more capacitors, and wherein the solid state switching device are arranged in the lower compartment between the bottom plate and the separation plate and in thermal contact with the bottom plate, wherein the one or more capacitors are arranged at a side of the separation plate that faces away from the lower compartment and are mounted on and substantially supported by the DC bus bars. The present invention thus provides a dedicated cooling system in which the separation plate acts as heat sink for the one or more capacitors while the solid state switching devices are cooled via more direct thermal contact with the bottom plate. Even though the capacitors are spaced apart from the channels in the bottom plate at least by the height of the side walls, efficient cooling of the capacitors is still achieved, while at the same time it is ensured that the cooling capacity provided by the liquid coolant is available first where it is needed most, i.e. near the solid state switching devices. As the DC bus bars are mechanically fixed to the separation plate, the bus bars and the separation plate can be placed into or out of the housing as a whole. Moreover, the DC bus bars aid in transferring heat from the one or more capacitors, via the separation plate and the side walls, to the bottom plate.

The separation plate is preferably substantially completely supported on the sidewalls and/or on the end sides, and in turn the one or more capacitors are preferably substantially completely supported on the separation plate. These components can thus be fixed to the separation plate and, during maintenance, be moved away from the lower compartment by removing the separation plate from the lower compartment.

The one or more capacitors in this manner may be cooled by contact with the corresponding DC bus bars which in turn are cooled by the separation plate. Each of the DC bus bars preferably comprises a portion which extends substantially parallel to the separation plate in such a manner that, when seen in projection onto the separation plate, substantially the entire surface of each of the capacitors that faces the separation plate is overlapped by one of the bus bars. Preferably at least 90% of said surface is overlapped by one of the bus bars, more preferably at least 95%. In order to improve thermal contact between the one or more capacitors and the DC bus bars and/or the separation plate, thermal paste or grease or the like may be applied to the surfaces of the capacitors that are directed towards the separation plate.

As the one or more capacitors are mounted on the DC bus bars, preferably substantially completely supported thereby, no spacers or the like for providing further support to these components and/or the DC bus bars may be required.

In an embodiment the motor drive unit further comprises AC bus bars which are electrically connected to the solid state switching devices, wherein each of the AC bus bars are mechanically fixed to the separation plate and thermally conductively connected thereto. The AC bus bars in this manner also benefit from cooling provided by the separation plate.

In an embodiment the AC bus bars extend through the separation plate to the solid state switching devices, wherein seals are provided around the portions of the AC bus bars which extend through the separation plate for electrically insulating the AC bus bars from the separation plate.

In an embodiment the separation plate makes direct contact with the sidewalls or makes contact with the sidewalls via a thermal paste or grease or the like applied between the separation plate and the side walls. Preferably such contact, i.e. direct contact or contact via thermal paste or grease or the like, of the separation plate with the sidewalls is along the entire length of facing surfaces of sidewalls. More preferably, the separation plate also contacts both end plates.

In an embodiment, the multiple capacitors are comprised in a capacitor assembly.

In an embodiment the solid state switching device comprise insulated gate bipolar transistors, metal-oxide-semiconductor field effect transistors and/or bipolar junction transistors.

In an embodiment the motor drive unit further comprises a first end plate arranged at a transverse end of the bottom plate and forming a transverse wall of the lower compartment, said first end plate comprising a cooling liquid feed connector for supplying fluid from the exterior of the motor drive unit to the channels, and a cooling liquid return connector for returning cooling liquid from the motor drive unit. The connectors, which extend through the first end plate and/or debouch in a through opening through the first end plate, are thus easily accessible from a same transverse side of the motor drive unit.

In an embodiment the motor drive further comprises a second end plate arranged at a transverse end of the bottom plate opposite to where the first end plate is arranged and forming a transverse wall of the lower compartment, wherein the first and/or second end plate is provided with connecting ducts adapted for fluidly connecting the cooling channels to each other. The bottom plate itself may thus remain free from connections between the channels, allowing the channels to be provided in the bottom plate in a particularly simple manner.

In an embodiment the housing further comprises along the exterior of the sidewalls a slot or ridge for sliding insertion along a support of the in-wheel motor into a mounting position for engaging the cooling liquid feed connector and the cooling liquid return connector with complementary cooling liquid connectors of the in-wheel motor. The motor drive unit can thus easily be slid into the in interior of the in-wheel motor in such a manner that a fluid-tight connection between the cooling liquid connectors of the in-wheel motor and the cooling liquid feed- and return connectors of the motor drive unit is made.

In an embodiment the bottom plate is formed as an extruded part with the cooling channels extending in the direction of extrusion. The bottom plate is preferably extruded from a metal, such aluminum, or from a metal alloy. It has been found that such an extruded bottom plate conducts heat better than a bottom plate that is made up from separate parts. Because of this it is highly preferred that the sidewalls are formed as a whole with the bottom plate during extrusion of the bottom plate.

In an embodiment the cooling channels extend substantially parallel to each other from one of the transverse ends of the bottom plate to an opposite of the transverse ends of the bottom plate.

In an embodiment the bottom plate comprises through openings which extend between the transverse ends of the bottom plate, wherein inserts are provided in said openings, each insert defining two or more of the cooling channels along the longitudinal direction of the bottom plate. The bottom plate can thus be manufactured with through openings having larger diameters than the channels, facilitating the manufacturing process in particular when the bottom plate is manufactured by extrusion.

In an embodiment the one or more capacitors are connected to the solid state switching devices by means of conductors which extend through the separation plate into the lower compartment. Preferably these conductors are provided at their ends which extend into the lower compartment with plugs which are accommodated in corresponding sockets in the lower compartment, to provide an easily attachable/detachable electrical connection between the outputs of the one or more capacitors and the inputs of the solid state switching devices.

In an embodiment the housing further comprises an upper compartment having a top plate and sidewalls, wherein the one or more capacitors are arranged in the upper compartment between the top plate and the separation plate, wherein the upper compartment, the separation plate and the lower compartment together enclose the one or more capacitors and the solid state switching devices. As the housing substantially completely envelops the electrical components, preferably in a substantially water tight manner, dust and moisture are prevented from passing from the exterior of the housing to the electrical components.

In an embodiment, the AC and DC bus bars comprise terminals on the exterior of the housing for a DC input current and one or more AC output currents respectively. Preferably the AC and DC bus bar terminals are arranged at side of housing away from the coolant liquid inlet and outlet connectors, so that the risk of a short circuit being formed is reduced, even in case coolant liquid is spilled, e.g. during mounting of the motor drive unit in an in-wheel motor.

According to a second aspect the present invention provides an in-wheel motor comprising a motor drive unit according to the previous claims, further comprising a stator and a rotor, wherein the motor drive unit is completely arranged within the interior of the stator. Preferably a plurality of electromagnets are attached on the outer surface of the stator, and a separate cooling system is provided in the in-wheel motor for cooling the electromagnets.

According to a third aspect, the present invention provides a motor drive unit for an in-wheel motor according to at least the preamble of claim 1, comprising the features of one or more embodiments of the first aspect of the invention, e.g. as claimed in the claims dependent on claim 1. The motor drive unit according to this aspect does not necessarily include the features of the characterizing portion of claim 1.

SHORT DESCRIPTION OF DRAWINGS

Figure 2:
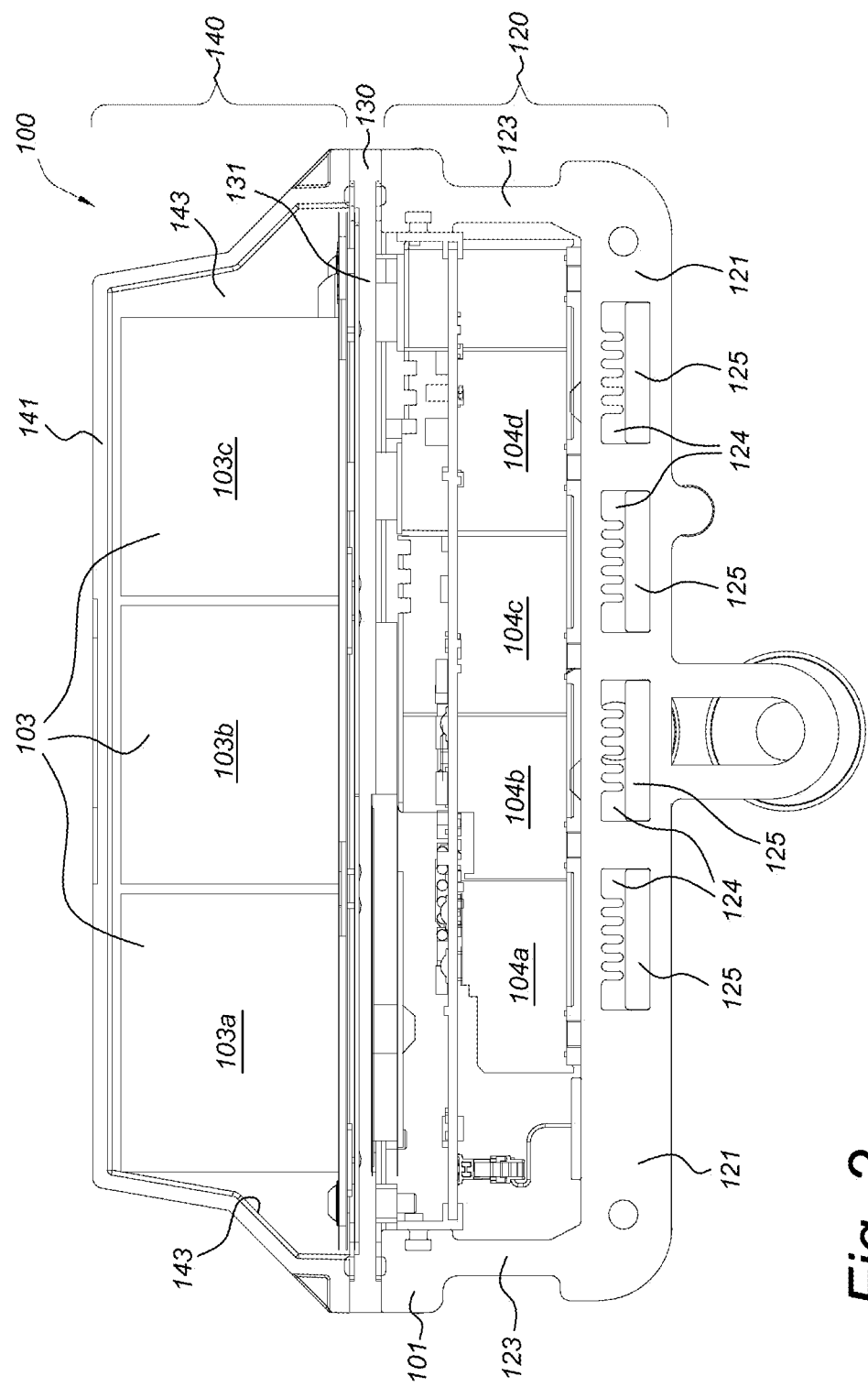
Figure 3A:
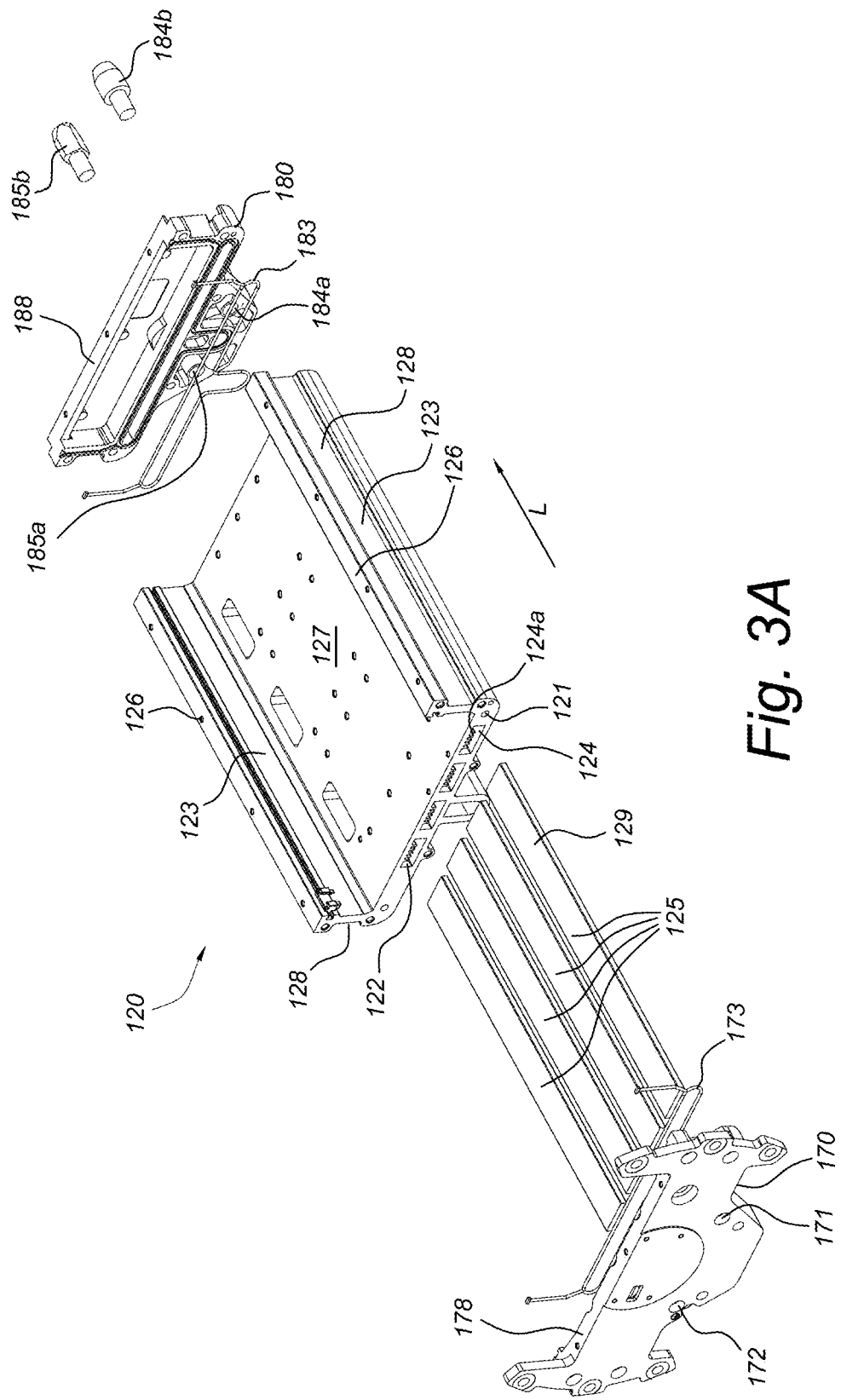
Figure 3B:
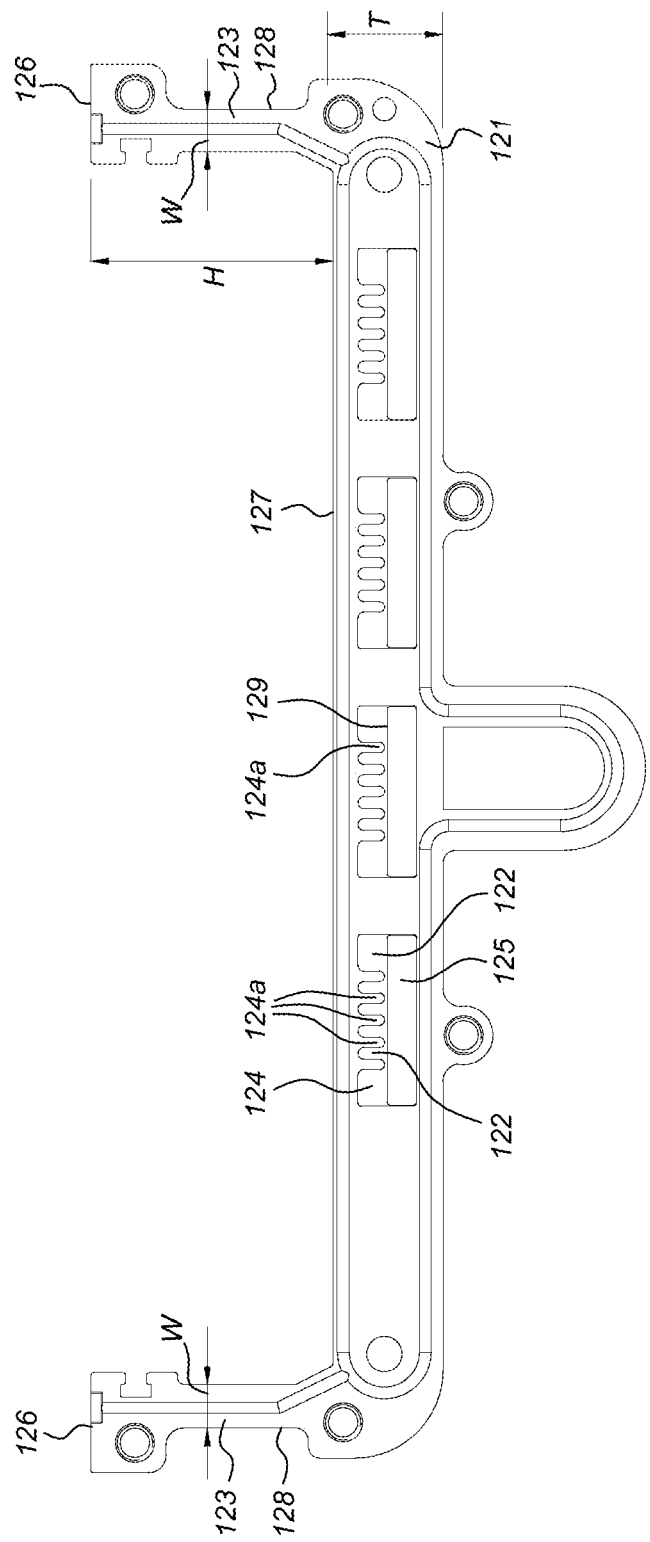
Figure 3C:
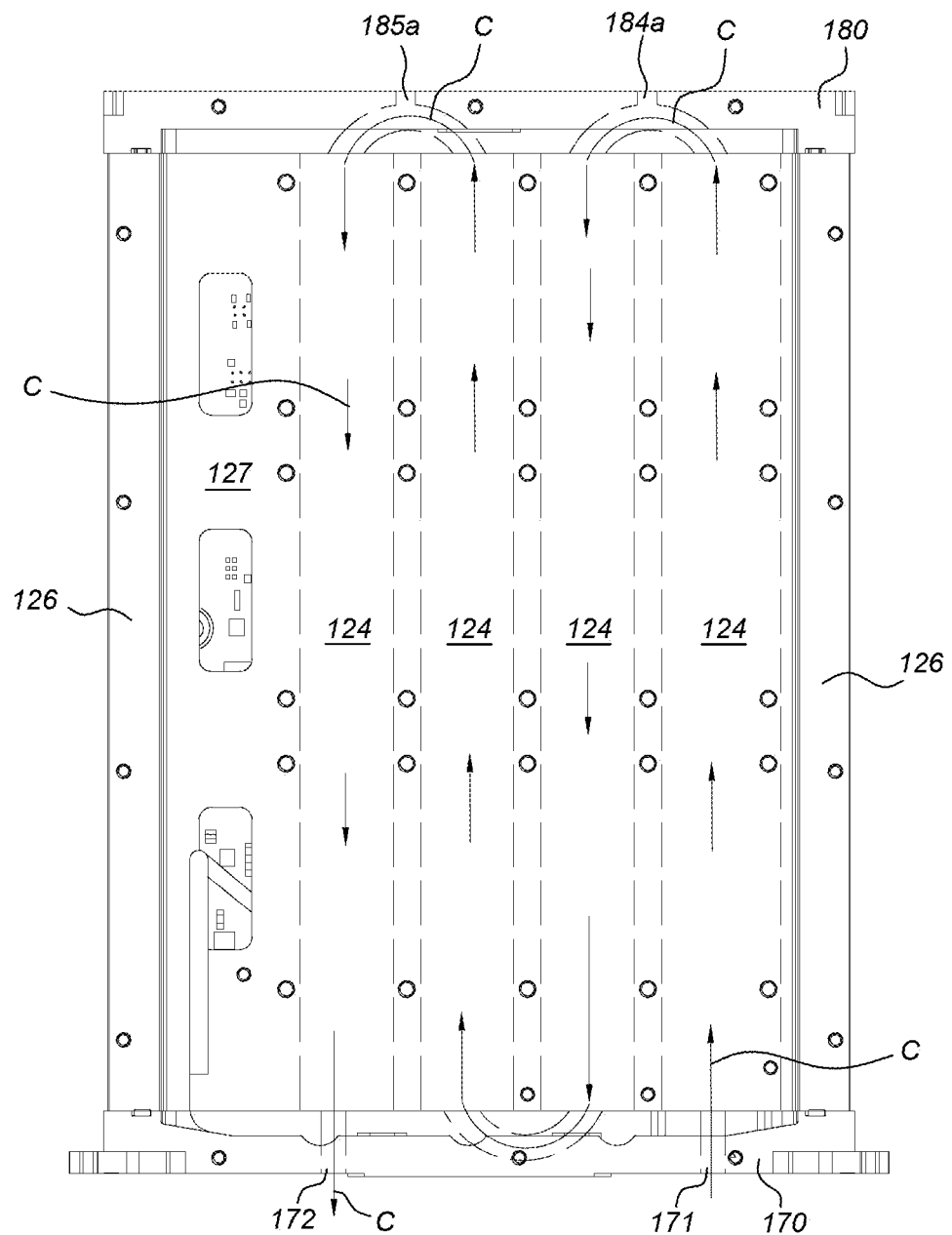
Figure 4A:
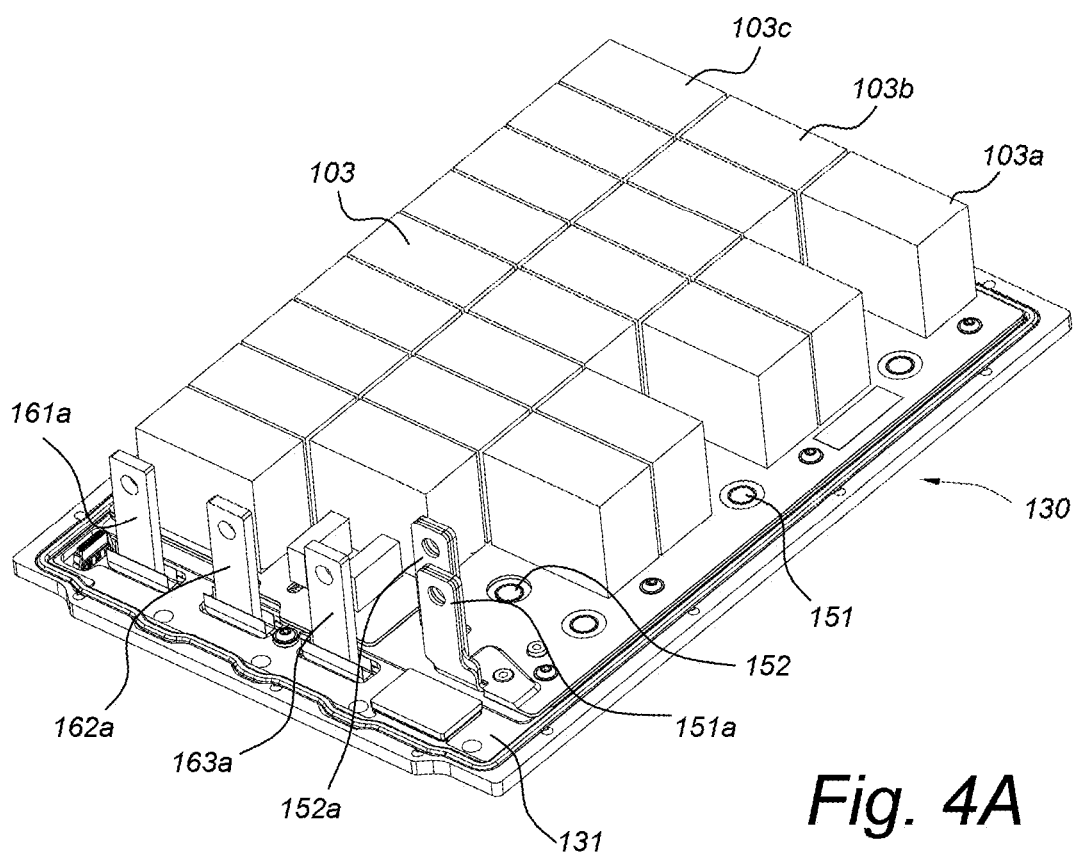
Figure 4B:
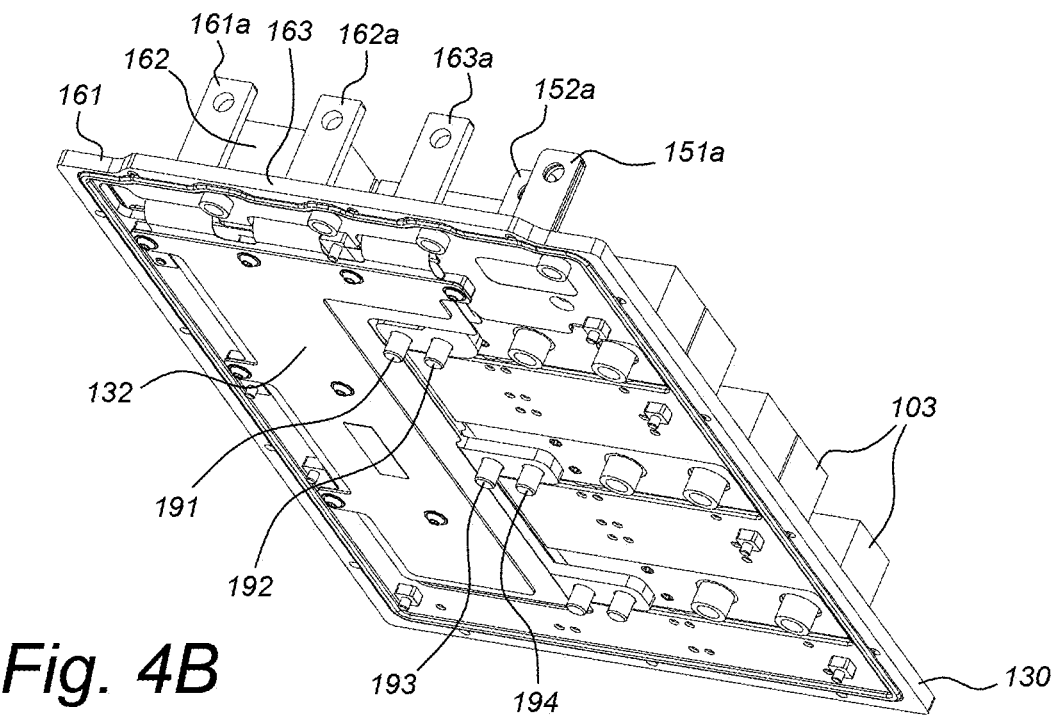

The present invention will be discussed in more detail below, with reference to the attached drawings, in which FIGS. 1A and 1B respectively show a cross-sectional view and an cut-away isometric view of a drive assembly comprising a motor drive unit according to the present invention;

FIG. 2 shows schematically a cross-sectional view of a motor drive unit according to the present invention;

FIGS. 3A, 3B and 3C respectively show an exploded isometric view of the lower compartment of the motor drive unit, a cross section of an end plate of the lower compartment, and a top view of the bottom plate of the lower compartment;

FIGS. 4A and 4B show different isometric views of the separator plate of FIG. 2.

DESCRIPTION OF EMBODIMENTS

FIG. 1A shows a cross-sectional view of a drive assembly 1 for use with the present invention. The drive assembly comprises a stator 30 with a hollow stator body 31 which has an outer surface 32 around which a rotor 60 is arranged. The drive assembly further comprises a connector stub 33, arranged at a vehicle side 2 of the assembly 1 for attaching the drive assembly to the vehicle. The connector stub 33 comprises a shaft 34 and flange 35 which is fixedly connected to the stator body 31. The flange 35 lies within the rotor 60 and has a larger diameter than a portion 36 of the shaft 34 which lies outside the peripheral surface 63 of the rotor 60. For supporting rotational movement of the rotor 60 around the axis of rotation R, vehicle side bearings 52 are provided via which the rotor supported on the stub 33 on the vehicle side. On the road side 3, the rotor is rotatably supported on the stator body 31 via road side bearings 53.

A plurality of permanent magnets 61 is attached on an inner circumferential surface 62 of the rotor 60 and can rotate around electromagnets 41 of the stator 30. The electromagnets 41 are fixed on the stator body 31 and drive rotation of the rotor by interaction between the permanent magnets 61 and the magnetic flux generated by the electromagnets 41. The stator 30 and rotor 60 form an electromotor adapted for directly driving rotation of a wheel around axis of rotation R. For controlling and powering the electromagnets 41, a motor drive unit 100 is arranged within the hollow stator body 31, the motor drive unit 100 comprising power control electronics 42 comprising components, such as IGBT's or other kinds of solid state switching devices, and capacitors, for converting electrical energy from a power supply system of the vehicle, e.g. a battery pack and/or an electric generator, to an AC form suitable for use by the electromotor. A resolver 81 provides an angular position signal indicative of an angular position of the rotor to the power control electronics so that the alternating current is supplied in phase with the magnetic field of the rotor.

To prevent overheating of the power control electronics when the electromotor is in operation, cooling ducts are provided in the motor drive unit 100 close to the power control electronics 42 within the interior of the stator body 31 and spaced apart from the body 31. Coolant is supplied to the cooling ducts via a coolant supply channel 45 which runs through the connector stub 33 from the exterior of the rotor to its interior. A flow path F for the liquid coolant is schematically indicated by the arrows F. After having cooled the power control electronics 42, the coolant flows via passage 46 in the connector stub 33, to a cooling jacket 37 which is provided on the outer surface 32 of the stator body 31. The cooling jacket 37 is provided with channels 38 which form a circuit that runs along the hollow cylindrical body 31 and provides a passage through which liquid coolant flows to cool the electromagnets 41 which are arranged at an outer side 40 of the cooling jacket 37. Relatively cold coolant can thus be supplied through the coolant supply channel 45 with the coolant warming up during its passage through the cooling ducts and absorbing heat energy from the power control electronics 42, and subsequently passing through channels 38 to absorb heat-energy from the electromagnets 41 before being removed from the drive assembly 1 and led back to the vehicle through a coolant discharge channel (not shown) which extends through the connector stub 33. The warmed up coolant is preferably cooled in a heat exchanger on the vehicle, after which it is recirculated through the coolant supply channel 45.

Power supply lines 43a, 43b for supplying power to the power control electronics 42 run from the exterior of the rotor 60, through passage 44 in the connector stub 33, to the power control electronics.

The rotor 60 comprises a substantially cylindrical rotor body 71 which has transverse ends 72,73 respectively at its vehicle side 2 and at its road side 3. Both transverse ends 72,73 are substantially closed off in order to prevent foreign particles, such as dust and wear particles from the road or released by a braking system of the vehicle, from entering the interior of the hollow rotor 60. The vehicle side of the rotor is substantially closed off by a side plate 74 which extends transversely to the axis of rotation R and by a cover plate 75. The side plate 74 and cover plate 75 are each provided with an opening through which the portion 34 of the connector stub 33 extends. The side plate 74 supports the vehicle side bearings 52 while the cover plate 75 is attached to the side plate 74 to cover the bearings 51 at their transverse vehicle side 2 and comprises an opening 77 through which portion 34 extends. The cover plate 75, together with a shaft seal 78 which is arranged between the inner circumferential edge 79 of the opening 77 and the outer circumference of the shaft 34 of the connector stub 33, prevents foreign particles from damaging the vehicle side bearings 52. Additionally, the cover plate 75 and shaft seal 78 substantially prevent such particles from entering the interior 5 of the rotor from the vehicle side 2, where the particles could interfere with the electromagnets 41.

The road side bearings 53, which are arranged at an inner side of the stator body 31, are covered on the road side 3 by a second cover plate 80. A resolver 81 rotationally connects the stator 30 to the second side plate 80 and is adapted for detecting an angular position of the rotor 60 relative to the stator 30.

Figure 1B:
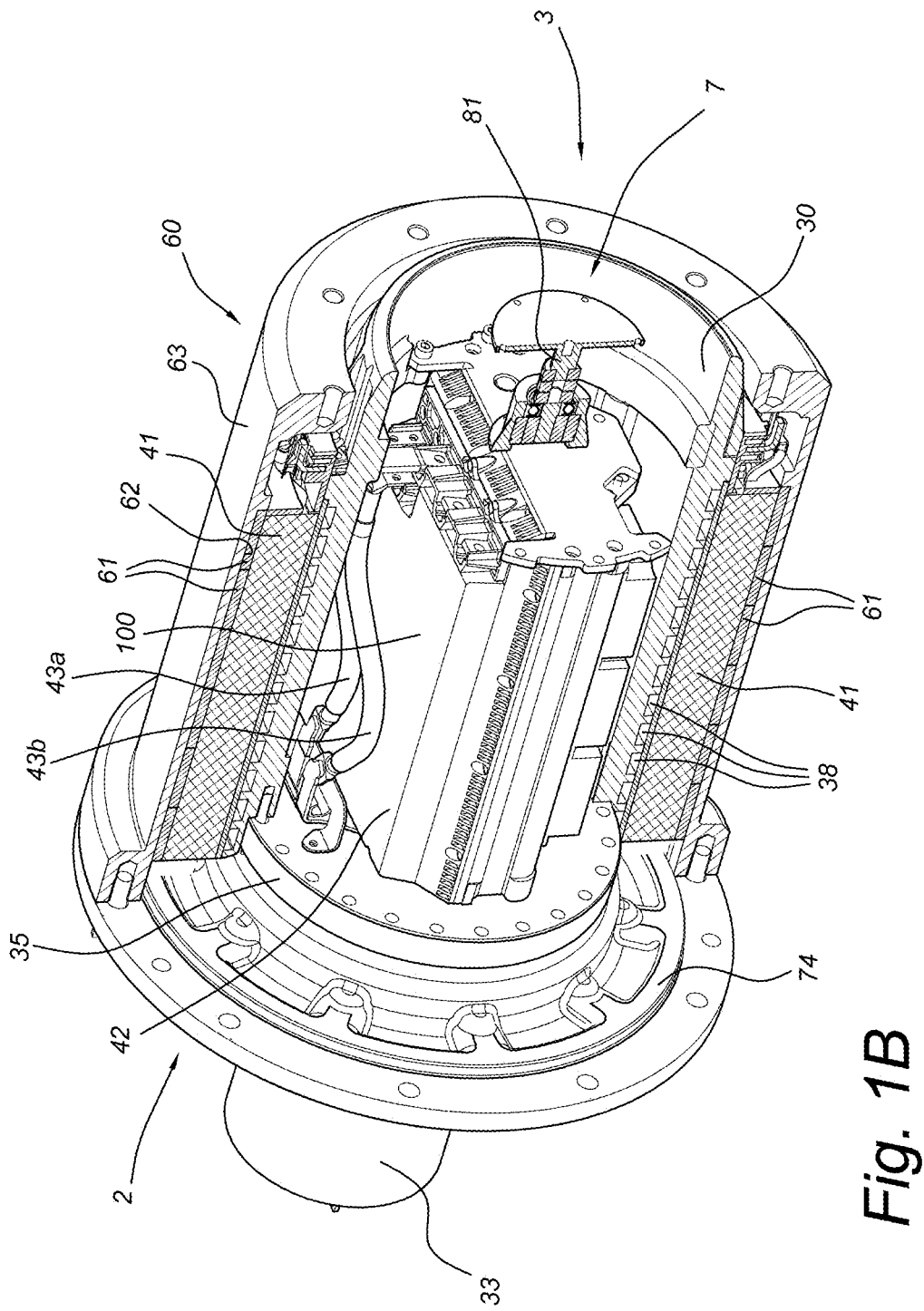

FIG. 1B shows a partially cut-away isometric view of the drive assembly of FIG. 1A, in which the second cover plate 80 and the road side bearings 53 however are not shown to allow a better view of the hollow stator body 31 and the resolver 81.

FIG. 2 shows a cross-sectional view of a motor drive unit 100 according to the present invention, adapted for converting a DC current at a relatively high voltage to a form suitable for powering the electromagnets of the in wheel motor. For this purpose the drive unit is provided with a capacitor assembly 103 with capacitors 103a-103c, having an input side to be connected to a source of DC current, such as a battery pack of an electrically powered vehicle, and an output side that is electrically connected to solid state switching devices 104a-104d, here in the form of IGBT's. The electrical components 103a-103c, 104a-104c are enclosed by a housing 101, with the solid state switching devices arranged in lower compartment 120 of the housing 101. For cooling the solid state switching devices, the lower compartment is provided with a bottom plate 121 through which through openings 124 extend in the longitudinal direction of the bottom plate. Inserts 125 arranged in the openings and which comprise dividing walls along the longitudinal direction, define parallel channels 122 for liquid coolant to flow through for cooling the bottom plate. The lower compartment further comprises sidewalls 123 which extend perpendicular from the bottom plate 121 and are formed as a single unit therewith, e.g. during an extrusion process, from a same material, preferably a metal such as aluminum. In this manner a good thermal conductivity between the bottom plate and sidewalls is achieved, so that flow of liquid coolant through the openings 124 cools both the bottom plate 121 and the sidewalls 123. The housing 101 further comprises a separation plate 130 which is supported by the sidewalls 123 and covers the lower compartment 120 so that the solid state switching devices 104a-104d are arranged between the bottom plate 121 and the separation plate 130. The capacitors 103a-103c are supported by the separation plate 130 on a side 131 of the separation plate facing away from the lower compartment 120. The separation plate thus provides a physical separation between the solid state switching devices 103a-103c and the capacitors 104a-104d. Moreover, the separation plate 130 forms a heat conducting surface towards the cooled sidewalls 123, where heat energy generated by the capacitors can be absorbed.

For protecting the capacitors 103a-c from outside influences, such as dust and moisture, the housing 101 further comprises an upper compartment 140 having a top plate 141 substantially parallel to the bottom plate 121, wherein sidewalls 143 extend from the top plate towards the separation plate 130. The upper compartment is preferably also made from a material having a high coefficient of heat transfer, e.g. aluminum, and is in thermal contact with the sidewalls 143 via the separation plate. In this manner some cooling of the capacitors at the sides thereof facing away from the separation plate 130 may be achieved.

FIG. 3A shows an exploded view of the lower compartment 120 of FIG. 2. The bottom plate 121 is provided with through openings 124 which run parallel to the longitudinal direction L of the bottom plate. As can be seen in FIG. 1, when the motor drive unit 100 is mounted in the in-wheel motor, the bottom plate is oriented with its longitudinal direction parallel to the axis of rotation R of the rotor 60. Referring back to FIG. 3A substantially flat inserts 125 are provided in the through openings 124.

FIG. 3B shows a side view of the inserts when arranged in the through openings 124. The through openings 124 are provided with wall portions 124a which define the channels 122 for liquid coolant to flow through when the inserts 125 are inserted in the openings 124 with a top surface of the insert close to or abutting the wall portions 124a. The use of inserts allows the bottom plate and side walls 123 to be manufactured as a single unit in an extrusion process. Once the bottom plate has been manufactured, the inserts 125 are inserted into the through openings 124 to define the specific shape and/or dimensions of the channels 122 for the liquid coolant. It will be appreciated that in an alternative embodiment the inserts may be provided with wall portions, and the through openings may have a substantially constant rectangular cross-section.

The sidewalls 123 have a height H from the top surface 127 of the bottom plate 120 and run along the entire length of the bottom plate. The minimum width W of the sidewalls 123 is one third of the thickness T of the bottom plate, to ensure sufficient thermal conductance capacity between the bottom plate and the side walls. The sidewalls have top surfaces 126 of a width at least 1.5 time greater than the minimum width W, to provide an enlarged surface for contacting the separation plate. Slots 128 in the sidewalls 123 extend longitudinally along the longitudinal direction L of the bottom plate, facilitate mounting of the motor drive unit on a corresponding support of the in-wheel motor.

For substantially closing off its transverse sides, the lower compartment is provided with a first end plate 170 at a first transverse side of the bottom plate 120, and a second end plate 180 at the opposite transverse side of the bottom plate. The first end plate 170 comprises ducts 171 and 172 there through, which fluidly connect respectively a liquid coolant feed connector with the channels 122, and a liquid coolant return connector with another portion of the channels 122. In this manner, the channels of the bottom plate 120 can easily be fluidly connected with an external liquid coolant supply and return by sliding the motor drive unit along its longitudinal direction towards corresponding connectors of the in-wheel motor. The second end plate 180 is provided with through openings 184a, 185a, which are closed off by plugs 184b, 185b. By unplugging the plugs from their through openings, liquid coolant can be drained from a location at the second end plate which is accessible from the open end of the hollow stator body. Seals 173, 183 are arranged between the bottom plate 121 and respective transverse end plates 170,180 for preventing FIG. 3C schematically shows a top view of the bottom plate 121, the first end plate 170 and second end plate 180, in which the through openings 124 below the surface 127 are indicated using dotted lines. The end plates 170,180 are provided with U-bend shaped connecting ducts 176, 186, for fluidly connecting the through openings 124 with each other. In this manner, liquid flow allow the direction of the arrows C is achieved.

FIGS. 4A and 4B each show an isometric view of the separation plate 130 with the capacitors 103 mounted thereon. FIG. 4A shows DC bus bars 151, 152 with terminals 151a, 152a for connecting to a relatively high voltage DC power source, such as a battery pack or electrical generator of an electric vehicle. The terminals 151a, 151b extend at an angle of about 90 degrees from respective portions of the bus bars 151,152 that extend substantially parallel to the separation plate 130. The separation plate 130 provides cooling to the capacitor assembly 103 at their sides facing the separation plate, as the substantially parallel portions of the DC bus bars 151,152 are in thermal contact with the separation plate, and the capacitors 103a-103c in turn are in thermal contact with the DC bus bars. It will be understood that though the thermal contact may comprise direct abutting contact, preferably a non-conductive thermal paste or the like is provided to improve the thermal contact between the DC bus bars 151, 152 and the separation plate 130 and/or between the capacitors 103 and the DC bus bars 151, 152.

Terminals 161a, 162a, 163a of respective AC bus bars are provided for outputting current that has been converted by the components 103a-103c and components 104a-104d to voltages suitable for powering electrical magnets of an in-wheel motor. Though the AC bus-bars 161,162,163 are mostly hidden from view by the capacitors, these bus bars also each comprise a portion which extends parallel to the separation plate 130.

Both the AC and DC bus bars are thermally and mechanically connected to the separation plate 130.

FIG. 4B shows that the separation plate is provided with a number of through openings, through which conductors 191, 192, 193, 194 extend from the capacitors 103 into the lower compartment to connect with the IGBTs 104a-104d therein. The conductors 191-194, at the side 132 of the separation plate 130 which faces the lower compartment, have ends which fit like plugs into corresponding sockets in the lower compartment, which sockets are electrically connected to the IGBTs 104a-104d.

The separation plate 130 has a peripheral edge arranged for making contact with the facing surfaces 126 of the sidewalls 123, and preferably also with the upward facing surfaces 178, 188 of the end plates 170 and 180, to provide good thermal contact between bottom plate 120 and the separation plate 130.

The motor unit can be slidably moved as a whole into an in-wheel motor having a hollow stator body, e.g. the in wheel motor of FIGS. 1A and 1B, wherein the hollow stator body is provided with supports on its interior surface for engaging the slots 128 on the exterior of the unit's sidewalls. The slots 128 in the sidewalls 123 in cooperation with the supports of the stator allow easy alignment of the ducts 171, 172 to corresponding connectors in the transverse flange of the stator. It is preferred that the liquid coolant connectors 171, 172 are arranged at the vehicle side of the motor drive unit, and that the bus bar terminals 151a, 152a, 161a,162a, 163a are arranged at the road side of the motor drive unit, so that the risk of coolant spilling on the terminals is reduced.

In summary, the invention relates to a motor drive unit for an in-wheel motor comprising a housing, capacitors and solid state switching devices arranged within the housing, the housing comprising: a lower compartment comprising a bottom plate, sidewalls which extend from the bottom plate, and end sides at the transverse ends of the sidewalls and bottom plate, wherein the bottom plate is provided with cooling channels for receiving a liquid coolant. The capacitors may be relatively high voltage components, and the solid state switching devices may be relatively low voltage components. Solid state switching devices may be arranged in the lower compartment between the bottom plate and the separation plate and in thermal contact with the bottom plate, and one or more capacitors may be connected to DC bus bars and are arranged at a side of the separation plate that faces away from the lower compartment.

The present invention has been described above with reference to a number of exemplary embodiments as shown in the drawings. Modifications and alternative implementations of some parts or elements are possible, and are included in the scope of protection as defined in the appended claims.

The invention claimed is:

1. Motor drive unit (100) for an in-wheel motor, comprising a housing (101) and one or more capacitors (103) and solid state switching devices (104) arranged within the housing, the housing comprising:
a lower compartment (120) comprising a bottom plate (121), sidewalls (123) which extend from the bottom plate (121), and end sides (125) at the transverse ends of the sidewalls (123) and bottom plate (121), wherein the bottom plate is provided with cooling channels (122) for receiving a liquid coolant;
wherein the housing further comprises a separation plate (130) covering the lower compartment (120), wherein the separation plate is in thermal contact with the sidewalls and with the one or more capacitors;
wherein the separation plate makes direct contact with the sidewalls or makes contact with the sidewalls via a thermal paste or grease applied between the separation plate and the side walls;
wherein the motor drive unit further comprises DC bus bars (151,152) which are electrically connected to the one or more capacitors (103), wherein the DC bus bars are mechanically fixed to the separation plate and thermally conductively connected thereto;
wherein the solid state switching devices (104) are arranged in the lower compartment (120) between the bottom plate (121) and the separation plate (130) and in thermal contact with the bottom plate (121), wherein the capacitors (103) are arranged at a side of the separation plate (130) that faces away from the lower compartment (120) and are mounted on and substantially supported by the DC bus bars (151, 152);
wherein the housing (101) further comprises an upper compartment (140) having a top plate (141) and sidewalls (143), wherein the capacitors (103) are arranged in the upper compartment (140) between the top plate (141) and the separation plate (130), wherein the upper compartment, the separation plate and the lower compartment together enclose the one or more capacitors and the solid state switching devices.

2. Motor drive unit according to claim 1, wherein the DC bus bars each comprise a portion which extends substantially parallel to the separation plate in such a manner that, when seen in projection onto the separation plate, substantially the entire surface of each of the one or more capacitors that faces the separation plate is overlapped by one of the bus bars.

3. Motor drive unit according to claim 2, wherein at least 90% of said surface is overlapped by one of the bus bars.

4. Motor drive unit according to claim 1, wherein a thermal paste or a thermal grease is applied to the surfaces of the capacitors that are directed towards the separation plate.

5. Motor drive unit according to claim 1, comprising AC bus bars (161, 162, 163) which are electrically connected to the solid state switching devices, wherein each of the AC bus bars are mechanically fixed to the separation plate (13) and thermally conductively connected thereto.

6. Motor drive unit according to claim 5, wherein the AC bus bars (161,162,163) extend through the separation plate to the solid state switching devices (104), wherein seals are provided around the portions of the AC bus bars which extend through the separation plate for electrically insulating the AC bus bars from the separation plate (130).

7. Motor drive unit according to claim 1, wherein the separation plate is substantially completely supported on the sidewalls and/or on the end sides, and the capacitors are substantially completely supported on the separation plate.

8. Motor drive unit according to claim 1, wherein said separation plate makes said contact along the entire length of facing surfaces of sidewalls.

9. Motor drive unit according to claim 1, wherein the one or more capacitors are comprised in a capacitor assembly.

10. Motor drive unit according to claim 1, wherein the solid state switching devices comprise insulated gate bipolar transistors, metal-oxide-semiconductor field effect transistors and/or bipolar junction transistors.

11. Motor drive unit according to claim 1, comprising a first end plate arranged at a transverse end of the bottom plate (121) and forming a transverse wall of the lower compartment (120,) said first end plate comprising a cooling liquid feed connector for supplying fluid from the exterior of the motor drive unit to the channels, and a cooling liquid return connector for returning cooling liquid from the motor drive unit.

12. Motor drive unit according to claim 11, further comprising a second end plate arranged at a transverse end of the bottom plate opposite to where the first end plate is arranged and forming a transverse wall of the lower compartment, wherein the first and/or second end plate is provided with connecting ducts adapted for fluidly connecting the cooling channels to each other.

13. Motor drive unit according to claim 11, the housing (101) comprising along the exterior of the sidewalls a slot or ridge for sliding insertion along a support of the in-wheel motor into a mounting position for engaging the cooling liquid feed connector and the cooling liquid return connector with complementary cooling liquid connectors of the in-wheel motor.

14. Motor drive unit according to claim 1, wherein the bottom plate (121) is formed as an extruded part with the cooling channels (122) extending in the direction of extrusion.

15. Motor drive unit according to claim 1, wherein the cooling channels extend substantially parallel to each other from one of the transverse ends of the bottom plate to an opposite of the transverse ends of the bottom plate.

16. Motor drive unit according to claim 1, wherein the bottom plate comprises through openings (124) which extend between the transverse ends of the bottom plate (121), wherein inserts are provided in said openings, each insert defining two or more of the cooling channels along the longitudinal direction of the bottom plate.

17. Motor drive unit according to claim 1, wherein the capacitors are connected to the solid state switching devices by means of conductors which extend through the separation plate into the lower compartment.

18. Motor drive unit according to claim 17, wherein the conductors are provided at their ends which extend into the lower compartment with plugs which are accommodated in corresponding sockets in the lower compartment.

19. Motor drive unit according to claim 1, wherein the capacitors (103) are connected to the solid state switching devices (104) by means of conductors which extend through the separation plate into the lower compartment.

20. In-wheel motor comprising a motor drive unit (100) according to claim 1, further comprising a stator and a rotor, wherein the motor drive unit is completely arranged within the interior of the stator.

* * * * *